2,865,716

PRODUCTION OF CRYSTALLINE COBALT TETRACARBONYL

Robert H. Hasek, Kingsport, Tenn., assignor to Eastman Kodak Company, Rochester, N. Y., a corporation of New Jersey No Drawing. Application September 1, 1954
Serial No. 453,681

6 Claims. (Cl. 23—203)

This application is a continuation-in-part of my application Serial No. 22,715, filed April 22, 1948, now Patent No. 2,691,046, issued October 5, 1954.

This invention relates to the synthesis of cobalt carbonyl. More particularly, it relates to the synthesis of pure cobalt tetracarbonyl in crystalline form, and to a process wherein cobalt salts are treated with carbon monoxide in alcoholic medium to produce cobalt carbonyl.

Basically, there are two methods which have been used for preparation of cobalt carbonyl. On the one hand, finely divided catalytically active cobalt metal has been treated with carbon monoxide, and a portion of the cobalt is converted to cobalt carbonyl. A typical example is cited in Gresham and Brooks, U. S. Patent No. 2,497,303, Example 1. In this case, a suspension of finely divided reduced sintered cobalt oxide in cyclohexane was treated with carbon monoxide at 140–160° and 650–750 atmospheres, pressure for two hours; approximately 25% of the cobalt was converted to carbonyl, which was recovered as a solution in cyclohexane. This example is quite typical of the art, and is characterized by the use of a finely divided catalytically active metallic cobalt, a relatively low conversion of the cobalt to carbonyl, and the isolation of the carbonyl as a solution in an inert solvent.

On the other hand, certain cobalt salts have been converted to cobalt carbonyl. An early example is the complicated scheme of Blanchard and coworkers (Inorganic Syntheses, vol. II, pp. 234–244) wherein carbon monoxide is slowly absorbed by an alkaline solution of a cobalt salt in the presence of a complexing agent such as an amino acid, a cyanide or a tartrate. The method involves the formation of a salt of cobalt carbonyl hydride, which must then be acidified and the hydride removed by a stream of inert gas, during which time it decomposes to cobalt carbonyl. The method is suitable for preparation of only minute amounts of cobalt carbonyl. Hieber (Z. anorg. allgem. Chem., 240, 261 (1939)) made use of high pressures and temperatures to produce cobalt carbonyl from carbon monoxide and cobalt sulfide or cobalt iodide. It was necessary to add a metal, such as copper, to bind the sulfur or iodine released in the process; this metal was added in finely divided form or could be present as a liner in the autoclave. Hieber's method of using an acceptor for the acid radical of the cobalt salt was a notable advance in the technique of synthesizing carbonyls.

It has now been found that cobalt carbonyl can be prepared by action of carbon monoxide at elevated temperatures and pressures on cobalt salts of organic acids in the presence of an acceptor for the organic acid radical. In particular, the nature and action of the acceptor is unusual and unexpected. Any of the usual reagents for binding or neutralizing acidic materials, such as alkali or alkaline-earth oxides, hydroxides and carbonates, or basic compounds such as ammonia, organic amino compounds and other nitrogen bases, are unsuitable for the formation of cobalt tetracarbonyl in that they react with cobalt carbonyl to form salts of cobalt carbonyl hydride or complex derivatives of cobalt carbonyl. Measurements of the acid strength of cobalt carbonyl hydride have shown that it is a very strong acid, comparable to hydrochloric acid. Therefore, a basic reagent will not neutralize an organic acid without first removing the strongly acid carbonyl hydride as a salt. Bases such as pyridine form complexes with metal carbonyls with displacement of carbon monoxide. In short, the above neutralizing agents cannot be used in the preparation of cobalt carbonyl because they react readily with the carbonyl.

I have found that the lower aliphatic primary alcohols, such as ethyl, n-propyl, n-butyl, and isobutyl alcohols, are effective acceptors of organic acids released in the synthesis of cobalt carbonyl from cobalt salts of said acids. The action of the acceptor is the esterification of the organic acid, which effectively removes the acid and the deleterious action of the acid on the carbonyl synthesis. The course of the reaction probably corresponds to the following Equation 1:

(1) 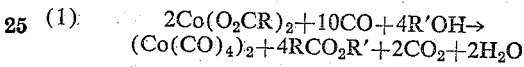

$$2Co(O_2CR)_2 + 10CO + 4R'OH \rightarrow (Co(CO)_4)_2 + 4RCO_2R' + 2CO_2 + 2H_2O$$

The reaction proceeds rapidly and in good yield. Moreover, it can be carried out not only on solutions of cobalt salts in alcohols, but at such concentrations that the initial charge is a slurry of undissolved cobalt salt in alcoholic medium. At such high concentrations, cobalt carbonyl is formed in such quantities relative to the volume of the alcohol that pure crystalline cobalt tetracarbonyl can be obtained by chilling the reaction mixture and filtering off the solid crystalline product.

An object of this invention is the synthesis of cobalt carbonyl. A further object of this invention is the preparation of solutions of cobalt tetracarbonyl of such high concentration that pure crystalline cobalt tetracarbonyl can be crystallized in good yields therefrom. Still another object of this invention is to provide a process for converting cobalt salts to crystalline cobalt tetracarbonyl.

The objects of this invention are accomplished by treating a mixture of a cobalt salt of an organic carboxylic acid and a lower aliphatic primary alcohol with carbon monoxide at elevated temperatures and pressures, subsequently chilling the reaction mixture and removing the crystalline cobalt tetracarbonyl.

Cobalt salts which may be used in the invention are cobalt salts of organic carboxylic acids. These acids must be free of non-benzenoid unsaturation and must contain only carbon, hydrogen, and oxygen. In other words, these acids must correspond to the formula $RCO_2H$ where R is hydrogen or an alkyl, cycloalkyl, or aryl group such as methyl, ethyl, propyl, isopropyl, cyclohexyl, phenyl, naphthyl or tolyl. Representative acids are formic, acetic, propionic, butyric, isobutyric, cyclohexane-carboxylic, benzoic, and toluic acids. In general, it is preferable to use an acid of low molecular weight, such as formic and acetic, in order to obtain the maximum concentration of cobalt in the cobalt salt.

Before the other factors in this process are considered, it is pertinent to speculate on the mechanism by which cobalt carbonyl is produced in this process. As indicated in Equation 1, the elimination of acetic acid is accomplished by esterification with the alcoholic medium. If this esterification process is an important factor in the conversion of the cobalt salt to carbonyl, then the reaction should be improved by using an alcohol and a cobalt salt such that the esterification reaction is rapid and complete. Actually, in the esterification of an acid with an alcohol, the reaction is incomplete, and an equilibrium exists, as in Equation 2:

(2)     $RCO_2H + R'OH = RCO_2R' + H_2O$

The conversion of a cobalt salt to cobalt carbonyl should be improved by selection of a salt and alcohol such that the reaction of Equation 2 is rapid and the equilibrium lies far to the right. Also, according to Equation 2, the carbonyl synthesis is carried out best in an excess of alcohol, and the initial reaction mixture should be substantially anhydrous.

Selection of the alcohol to be used in this process involves more than consideration of the esterification Reaction 2. It is well known that alcohols react with cobalt carbonyl to displace carbon monoxide and form a lower carbonyl which contains the alcohol in some complex structure. This reaction has been formulated variously as follows:

(3)     $Co(CO)_4)_2 + CH_3OH \rightarrow Co_2(CO)_5 \cdot CH_3OH + 3CO$ (4)     $3(Co(CO)_4)_2 + 12CH_3OH \rightarrow$
$2(Co(CH_3OH)_6)(Co(CO)_4)_2 + 8CO$ In view of these reactions, it is surprising that pure crystalline cobalt tetracarbonyl is isolated from an alcoholic reaction medium in the practice of my invention. As a possible explanation of this unexpected result, it can be postulated that under an elevated pressure of carbon monoxide, reactions of the type of (3) and (4) are forced to the left, and if the reaction mixture is chilled before the carbon monoxide pressure is released, the rate of the forward reaction at low temperature is slow enough to permit isolation of the cobalt tetracarbonyl. However, the choice of the alcohol to be used in this carbonyl synthesis must be balanced between selection on the basis of high reactivity in the esterification Reaction 2 and low reactivity in the formation of alcohol complexes (3) and (4). In line with the analysis, it has been noted that n-butanol is superior to n-propanol, which in turn is superior to ethanol, as an alcoholic medium for this process, and methanol is generally not a suitable medium. The reaction of n-butanol with cobalt tetracarbonyl is quite slow, even at room temperature, but butanol is still a very reactive alcohol in esterification reactions. In general, any lower aliphatic primary alcohol containing 2 to 8 carbon atoms is a suitable reaction medium, and the intermediate members of this group (3–5 carbon atoms) are the best balance between high reactivity in the esterification reaction and low reactivity in the formation of alcohol-carbonyl complexes. Secondary alcohols, such as isopropyl alcohol, are distinctly less suitable, and tertiary alcohols, such as t-butyl alcohol, cannot be used at all. With other than primary alcohols, a complication arises from the reaction of the alcohol with carbon monoxide in the presence of cobalt carbonyl to form a carboxylic acid (5).

(5)     $ROH + CO \rightarrow RCO_2H$

The alcohol must not contain any substituent groups deleterious to the reaction. Thus, chloro alcohols (chlorohydrins), amino alcohols, nitro alcohols, and olefinic alcohols cannot be used. However, alkyl and alkoxy substituents are permissible, as in isobutyl alcohol and 2-methoxyethanol ("Methyl cellosolve").

In view of the esterification Reaction 2 it would appear desirable to start with an anhydrous mixture of cobalt salt and alcohol for the preparation of cobalt carbonyl. In practice, however, the course of the reaction is not affected adversely by moderate amounts of water. Thus, the cobalt salt need not be anhydrous, but a salt such as cobaltous acetate tetrahydrate can be used in the process. The effectiveness of the esterification reaction in removing the organic acid released from the cobalt salt is a function of the relative concentrations of the alcohol, the ester and water in the reaction medium. For the case of cobaltous acetate tetrahydrate, in butanol, a satisfactory yield of cobalt carbonyl (78% of theory) was obtained from 600 g. of cobalt salt and 2 l. of butanol, which in theory would yield a final mixture with a butanol/butyl acetate/water molar ratio of 17/5/14.5. However, experience has shown that lower yields of cobalt carbonyl are obtained when more than 600 g. of cobaltous acetate tetrahydrate is charged with 2 l. of butanol. On the other hand, it is necessary to use more than a certain minimum amount of cobalt salt to obtain crystalline cobalt carbonyl from the chilled reaction mixture (since some carbonyl remains in solution). This minimum amount is about one percent of cobaltous acetate tetrahydrate in butanol. Naturally, this minimum figure will vary for different alcohols.

The reaction conditions for conversion of cobalt salts to carbonyl in high concentration are fairly specific. The reaction takes place rapidly and exothermically at 200° C., but occurs only very slowly below 180° C. It is also undesirable to use reaction temperatures much beyond 220° C. (although higher temperatures can be used) because certain side reactions decrease the yield of cobalt carbonyl. The pressure of carbon monoxide is preferably maintained above 2,000 p. s. i. during the reaction. There is no upper limit of pressure beyond which the reaction is affected adversely; the upper limit is strictly a function of the practical working capacity of the equipment. It is an advantage of this invention that a suitable operating pressure of, say, 3,000 p. s. i. is entirely within the range of commercially available pressure equipment. In practice it would be possible but not necessary to operate at pressures up to 10,000 p. s. i. or more.

Cobalt carbonyl is a yellow crystalline solid with a composition indicated by the formula $(Co(CO)_4)_2$. It is also known as cobalt tetracarbonyl and more specifically as dicobalt octacarbonyl. All three names are used in the art; in the description of this invention, the term "cobalt tetracarbonyl" is understood to refer to the crystalline from of composition $(Co(CO)_4)_2$.

The practice of this invention is illustrated by the following examples.

*Example 1*

A mixture of 600 g. of technical grade cobaltous acetate tetrahydrate (24.9% cobalt) and 2,000 cc. of n-butyl alcohol was charged to a 4,600-cc. stainless steel rocking-type autoclave. The autoclave was sealed, flushed with nitrogen, pressured to 1,500 p. s. i. with carbon monoxide, and heated to 200° C. At this point (2,900 p. s. i.) gas absorption started and more carbon monoxide was pressed in to maintain a pressure of 3,000 p. s. i. Adsorption continued for 30 min., and the reaction conditions were maintained for an additional 30 min. The autoclave was then cooled to 0° C., the pressure was vented, and the product was removed and stored in a cold box (approximately 0° F.) for several hours.

The crystalline cobalt tetracarbonyl present in the product upon removal from the cold box was filtered on a Büchner funnel and pressed under a rubber dam. The crystals were removed and slurried in 500 cc. of cold ether (−70° C.), filtered again and washed twice on the filter with 400-cc. portions of cold ether. The product was pressed under a rubber dam and then transferred to a large glass tube, where it was dried at room temperature in a slow stream of carbon monoxide. The yield of cobalt tetracarbonyl was 340 g. (78 percent of the theoretical amount).

*Example 2*

Technical grade cobalt acetate tetrahydrate was dried overnight at 50–55° C. and then for several hours at 114° C. The loss in weight was 29.5% (theory, 28.9%) and the dry salt contained 34.5% cobalt (theory for anhydrous cobaltous acetate, 33.4%).

A suspension of 485 g. of the dry salt in 2 l. of n-butyl alcohol was processed and worked up as in Example 1. The yield of cobalt tetracarbonyl was 366 g. (76 percent of the theoretical amount).

*Example 3*

A mixture of 600 g. of technical grade cobaltous acetate tetrahydrate and 2 l. of n-propyl alcohol was processed and worked up as in Example 1. The yield of cobalt tetracarbonyl was 201 g. (46 percent of the theoretical amount).

*Example 4*

A mixture of 600 g. of technical grade cobaltous acetate tetrahydrate and 2 l. of absolute ethyl alcohol was processed and worked up as in Example 1. The yield of cobalt tetracarbonyl was 130 g. (30 percent of the theoretical amount).

*Example 5*

A mixture of 150 g. of commercial grade cobaltous acetate and 1350 g. of n-butyl alcohol was placed in a 1-gallon stainless steel rocking autoclave and was agitated at 200° C. under a pressure of 3000 p. s. i. of carbon monoxide for 2 hours. The dark reaction solution contained 21.8 mg./ml. of cobalt; no cobaltous salts were present, as determined by spectral transmittance. The acid number of the solution was zero.

When the solution was chilled in a cold box (—40° C.) yellow crystals of cobalt tetracarbonyl were deposited. These were filtered, washed with cold methanol and dried under an atmosphere of carbon monoxide. The yield was 61 g. or 51 percent of the theoretical. The filtrate remaining after removal of the cobalt tetracarbonyl contained 8.64 mg./ml. of cobalt.

*Example 6*

A mixture of 150 g. of cobalt formate dihydrate and 100 cc. of 2-methoxyethanol ("methyl Cellosolve") was placed in a stainless steel rocking-type autoclave, which was flushed with carbon monoxide, pressured to 3000 p. s. i. with carbon monoxide and heated to 200° C. The pressure increased to 4550 p. s. i. and then dropped to 2950 p. s. i. over a period of 3.7 hours. The autoclave was cooled to room temperature, vented to 1000 p. s. i., and placed in a brine bath at 0–5° C. for several hours. The autoclave was then vented and discharged. The dark liquid product was stored in a cold box (0° F.) for a few days. The crystalline cobalt tetracarbonyl was then recovered by filtration.

*Example 7*

A mixture of 200 g. of technical grade cobaltous acetate tetrahydrate and 1000 cc. of n-hexyl alcohol was heated in an autoclave at 200° C. under 4200 to 2900 p. s. i. pressure of carbon monoxide. The autoclave was chilled to 0–5° C. before the carbon monoxide pressure was released and the product was then chilled in a Dry Ice box for several hours. Recovery of the cobalt tetracarbonyl was complicated by the presence of solidified hexyl alcohol, which was allowed to melt on the filter, but otherwise the cobalt tetracarbonyl was recovered in the usual manner.

*Example 8*

Five hundred grams of commercial cobalt 2-ethyl-hexoate solution ("Cobalt Octasol Liquid 6%," a product of the Harshaw Chemical Company, Cleveland, Ohio) was concentrated under reduced pressure to 240 g., which was then processed with 1000 cc. of n-butyl alcohol as described in Example 6. The product was worked up in the usual manner to recover the crystalline cobalt tetracarbonyl.

The advantages and specific nature of my invention are particularly evident in view of the following four examples. Thus, in Example 9, water was found to be an ineffective medium; in Example 10, the addition of a basic reagent to act as neutralizing medium gave negative results; in Example 11, the use of an inorganic salt of cobalt gave poor results, and it is possible that the yield of carbonyl was largely due to addition of an organic acid as transfer agent. In Example 12, it was found that the alcoholic medium alone converts a cobalt salt of an organic acid essentially to cobaltous oxide, which, in turn, gave a poor yield of carbonyl.

*Example 9*

A solution of 150 g. of cobaltous acetate tetrahydrate in 1,350 cc. of water was treated with carbon monoxide at 3,000 p. s. i. and 200° C. for 2 hours. No appreciable absorption of carbon monoxide took place. The product contained no cobalt tetracarbonyl.

*Example 10*

A mixture of 400 g. of cobaltous acetate tetrahydrate, 352 g. of triethanolamine, and 1,648 g. of n-butyl alcohol was treated with carbon monoxide at 3,000 p. s. i. and 200° C. for 2 hours. The autoclave was chilled to 0° C., vented and the reaction mixture was stored at 0° F. for several hours. No cobalt tetracarbonyl was deposited.

*Example 11*

A mixture of 200 g. of cobaltous carbonate, 2 l. of n-butyl alcohol and 20 g. of glacial acetic acid was treated with carbon monoxide at 3,000 p. s. i. and 200° C. for 2.5 hours. The autoclave was chilled to 0° C., vented and the product was removed and stored at 0° F. for several hours. The solid material was removed by filtration, shaken with ether and filtered. The filtrate was stored at 0° F. until the cobalt tetracarbonyl had crystallized. The crystalline carbonyl was filtered and dried in a stream of carbon monoxide. The yield was 43 g. (15 percent of theory, based on cobaltous carbonate; 150 percent of theory, based on acetic acid).

*Example 12*

A mixture of 400 g. of cobaltous acetate tetrahydrate and 2 l. of n-butyl alcohol was heated under nitrogen in an autoclave at 200° C. for 2 hours. The product, when filtered, gave 93 g. of a light brown solid, which was washed with water and dried at 70° C. This product contained 74% cobalt (theory for CoO, 78.7%).

A slurry of 42.5 g. of the above solid product in 1,000 g. of n-butyl alcohol was treated with carbon monoxide at 3,000 p. s. i. and 200° C. for 70 min. No measurable absorption of gas took place. The autoclave was chilled to 0° C., the product was removed and filtered, and the solid residue was shaken with ether. The suspension was allowed to settle and the ether extract was decanted and stored at 0° F. for several days. The cobalt tetracarbonyl which crystallized was filtered and dried in a stream of carbon monoxide. The yield was 10 g. (11 percent of the theoretical amount).

A considerable body of literature exists in which cobalt carbonyl is used as a catalyst or reagent. In practically all cases, the cobalt carbonyl is prepared and used in situ, by the action of carbon monoxide on cobalt metal or cobalt salts. In these cases, the cobalt carbonyl is obtained and used in solution, and is rarely characterized to any further extent. These solutions are not suitable sources of crystalline cobalt tetracarbonyl, not only because they are generally too dilute to permit crystallization of the solid carbonyl at low temperatures, but also because such solutions may contain other carbonyls, such as cobalt carbonyl hydride.

Crystalline cobalt tetracarbonyl is the most convenient and most concentrated catalyst for (1) the oxo reaction or hydroformylation reaction, which consists of the addition of carbon monoxide and hydrogen to olefinic compounds to form aldehydes, (2) a number of reactions of carbon monoxide and hydrogen which are related to the oxo reaction, (3) the carboxylation reaction, which consists of the addition of carbon monoxide and alcohols to olenfinic compounds to form esters, (4) the hydrocyanation reaction, which consists of the addition of hydrogen cyanide to olenfinic compounds to form nitriles, and (5) the homogeneous phase hydrogenations of unsaturated aldehydes and ketones to saturated aldehydes and ketones, of aldehydes and ketones to alcohols, and of benzyl alcohols to hydrocarbons. Although these reactions are catalyzed also by metallic cobalt catalysts (in which case the action of the carbon monoxide in the reaction system on the cobalt catalyst generates varying amounts of cobalt carbonyl), the use of a metallic cobalt catalyst is less advantageous because (1) the system is heterogeneous, (2) the cobalt is not used as efficiently because it is not completely converted to carbonyl, and (3) the activity of the solid catalyst varies according to certain physical factors which, in general, determine the activity of any solid catalyst. Cobalt tetracarbonyl, on the other hand, is used in homogeneous solution, and because it is a definite crystalline compound, is repeatedly obtainable in a state of very high and reproducible catalytic activity and can be used in exact concentrations.

Cobalt tetracarbonyl is also the best source of certain cobalt carbonyl derivatives, which are of interest and utility as catalysts or reagents in certain reactions of carbon monoxide. Such derivatives include cobalt carbonyl hydride, the mercuric salt of cobalt carbonyl hydride, adducts of hydrogen cyanide and cobalt tetracarbonyl, and the adduct of cobalt carbonyl hydride and butadiene.

I claim:

1. A method of preparing crystalline cobalt tetracarbonyl, comprising subjecting a mixture of a cobalt salt of an organic carboxylic acid having the formula $RCO_2H$, where R is selected from H, alkyl, cycloalkyl and aryl groups free of non-benzenoid unsaturation and containing only carbon, hydrogen and oxygen, with a lower aliphatic primary alcohol containing 2 to 8 carbon atoms, to contact with a gas consisting essentially of carbon monoxide at around 200° C. and above about 2000 p. s. i. to convert a substantial quantity of the cobalt to cobalt carbonyl, then reducing the temperature of the mixture to form crystalline cobalt tetracarbonyl therein and recovering crystalline cobalt tetracarbonyl from said mixture.

2. A method of preparing crystalline cobalt tetracarbonyl, comprising subjecting a mixture of cobalt acetate with a lower aliphatic primary alcohol containing 2 to 8 carbon atoms to contact with a gas consisting essentially of carbon monoxide at around 200° C. and above about 2,000 p. s. i. to convert a substantial quantity of the cobalt to cobalt carbonyl, then reducing the temperature of the mixture to form crystalline cobalt tetracarbonyl therein and recovering crystalline cobalt tetracarbonyl from said mixture.

3. A method according to claim 1 wherein the alcohol in n-butanol.

4. A method of preparing crystalline cobalt tetracarbonyl, comprising subjecting a mixture of cobalt acetate with n-butanol to contact with a gas consisting essentially of carbon monoxide at around 200° C. and above about 2,000 p. s. i. to convert a substantial quantity of the cobalt to cobalt carbonyl, then reducing the temperature of the mixture to form crystalline cobalt tetracarbonyl therein and recovering crystalline cobalt tetracarbonyl from said mixture.

5. A method according to claim 1 wherein the alcohol is selected from those having 3 to 5 carbon atoms, inclusive.

6. A method according to claim 1 wherein the alcohol has an alkoxy substituent.

References Cited in the file of this patent

UNITED STATES PATENTS

| | | |
|---|---|---|
| 2,473,993 | Gresham | June 21, 1949 |
| 2,476,263 | McKeever | July 12, 1949 |
| 2,477,553 | McKeever | July 26, 1949 |
| 2,477,554 | McKeever | July 26, 1949 |
| 2,748,167 | Hagemeyer et al. | May 29, 1956 |